United States Patent [19]
Gresch

[11] Patent Number: 4,737,283
[45] Date of Patent: Apr. 12, 1988

[54] PROCESS AND APPARATUS FOR CLARIFYING LIQUIDS

[75] Inventor: Walter Gresch, Niederweningen, Switzerland

[73] Assignee: Bucher-Guyer, AG, Niederweingen, Switzerland

[21] Appl. No.: 849,957

[22] Filed: Apr. 9, 1986

[30] Foreign Application Priority Data

May 22, 1985 [CH] Switzerland ............ 2168/85

[51] Int. Cl.⁴ .................................................. C02F 9/00
[52] U.S. Cl. ................................. 210/195.1; 55/165; 55/189; 210/258; 210/416.1; 210/416.3
[58] Field of Search .................. 210/416, 257.2, 416.3, 210/195.2, 664, 195.1, 805, 808, 167, 120, 194, 180, 188, 196, 218, 197, 251, 258, 406, 436, 472, 539; 55/165, 164, 189

[56] References Cited

U.S. PATENT DOCUMENTS 3,663,403  5/1972  Christenson et al. ............ 210/257.2
4,010,012  3/1977  Griffin et al. ........................ 55/164

Primary Examiner—Frank Sever
Attorney, Agent, or Firm—Edmund M. Jaskiewicz

[57] ABSTRACT

A process and apparatus is disclosed for degassing liquids, particularly raw juices from fruits and berries. The liquid which is to be clarified or liquid residues remaining after clarification are subjected to degassing while circulating in a processing installation. A vacuum producing device is provided through which the liquids are circulated.

3 Claims, 2 Drawing Sheets

PROCESS AND APPARATUS FOR CLARIFYING LIQUIDS

The present invention relates to the clarifying or purifying of liquids, more particularly, to a process and apparatus for clarifying raw juices from fruit and berries wherein the residues separated from the liquid by filtering are recycled into the liquid to be clarified.

Such processes wherein the residues separated from the liquid by filtering are recycled into the liquid to be clarified are used, for example, in the ultra- or micro-filtration of raw juices from a wide variety of fruits, grapes and berries. Such processes may also be used in the extraction of juices from agriculture products including grain and vegetables. In this method of processing juices, various oxidation phenomena may occur as a result of the juices having air containing oxygen entrapped therein. This air may be already present in the liquid or is drawn into the liquid as the liquid circulates through the processing apparatus.

An increasing concentration of air can also be detected when the air absorbed in the juices cannot be completely decomposed above the clarified juice (permeate) in the filtering device. As a result, a remaining residue of air is recycled into the raw juice by the return line or remains in the processing system. The presence of air in clarified liquids, particularly juices from fruit and berries, may be detrimental in that it adversely affects the taste of the liquid and may also adversely affect the stability of the liquid when it is stored over a period of time.

It is therefore the principal object of the present invention to provide a novel and improved process and apparatus for the clarification of liquids wherein the residues separated from the liquid by filtering are recycled into the liquid to be clarified.

It is a further object of the present invention to provide such a process and apparatus in which oxidation caused by gases entrapped in the liquid can be substantially decreased in an economically feasible manner.

The objects of the present invention are achieved and the disadvantages of the prior art are eliminated by subjecting to degassing the liquid and/or liquid residues while they are in circulation throughout the apparatus. As a result, air entrapped in the liquid can be significantly reduced.

According to one aspect of the present invention, a process for the clarification of liquids, particularly raw juices from fruits and berries, may comprise subjecting the liquid to be clarified to filtration to separate therefrom liquid residues which are then circulated into the liquid to be clarified. Either the liquid or the liquid residues are then subjected to degassification while they are being circulated so as to remove air and any other gasses entrapped therein.

An apparatus for carrying out the present invention may comprise a receptacle for the liquid to be clarified and a filtration device connected to the receptacle by a delivery line. The filtration device is connected by a return line to the receptacle to circulate liquid residue therein. A vacuum producing means is connected to either of the return line or the delivery line for degassifying respectively the liquid or liquid residue circulating there through. In a modification, the vacuum producing device could also be connected to the receptacle below the level of liquid contained therein.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment and modifications of the present invention will be described in detail.

Figure 1:
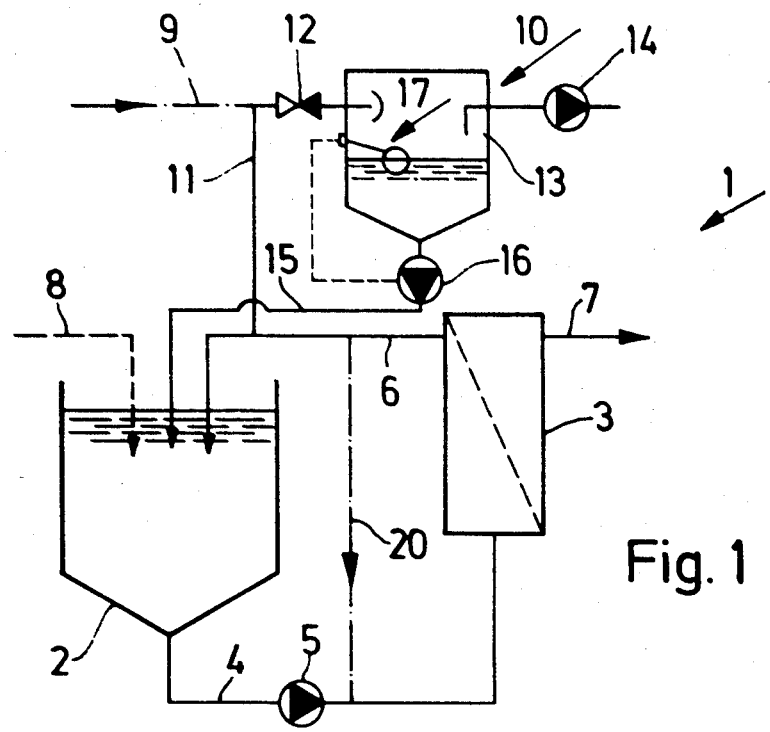
FIG. 1 is a diagrammatic representation of the processing apparatus according to the present invention.

As may be seen in FIG. 1, an apparatus for clarifying liquids, particularly raw juices from fruit and berries, is indicated generally at 1 and comprises a receptacle 2 which may be open as illustrated for receiving the raw juices or liquid to be clarified. A filtering or ultrafiltering device 3 is connected by a delivery line 4 to the receptacle 2. The delivery line 4 is provided with a pump 5 which pumps the raw juice from the receptacle 2 into the filtering device 3.

A return line 6 recirculates the liquid residues, also called retentate, from the filtering device 3 into the receptacle 2. The clarified liquid, or permeate, is discharged from the filtering device 3 through line 7 for further use.

The receptacle 2 is supplied through a supply line 8 with the liquid to be clarified as may also be seen in FIG. 1, the liquid to be clarified may be supplied to the apparatus through a supply line 9 directly to a vacuum producing device 10 which will be described in further detail below. The vacuum producing device 10 which removes air or other gasses from the liquid residues is connected to the return line 6 by an intake line 11 which discharges tangentially into a vacuum container 13 through an adjustable control valve 12. The container 13 is provided with a pump 14 which evacuates the interior of the container to produce the vacuum. The liquid that is circulated from return line 6 for the purpose of degassing can be metered through the control valve 12.

The liquid which collects in the vacuum container 13 is removed from the container 13 by a discharge line 15 having a feed pump 16 connected therein so that the liquid is re-circulated into receptacle 2 and is mixed with the remaining amounts of liquid there. The vacuum container 13 is further provided with a level-control device 17 for controlling the level of liquid therein. Alternatively, it is thus possible to supply the liquid to be clarified through supply line 9 instead of supply line 8.

By connecting the vacuum producing device 10 to the return line from the filtering device, a typical processing installation for clarifying liquids can thus be subsequently equipped with the apparatus of the present invention. The control valve functions to meter quantitatively the liquid to be degassed. Because the return line 6 which is connected to the vacuum producing device 10 empties into the liquid into the receptacle 2, it is a relatively simple matter to prevent a partial vacuum from occurring in the return line. Such a partial vacuum could adversely affect the filtering device and particularly in certain ultrafiltration systems could cause a separation effect on the filter membranes attached to their supports.

As a modification, the receptacle 2 can also be constructed as an evacuable chamber located above the level of liquid in the receptacle. Such a modification is particularly suited for smaller installations which are to be constructed in which a relatively inexpensive structure is desired. For an apparatus having a larger receptacle, the economic efficiency will be less favorable because of the greater wall thickness which would be required for the container.

Figure 2:
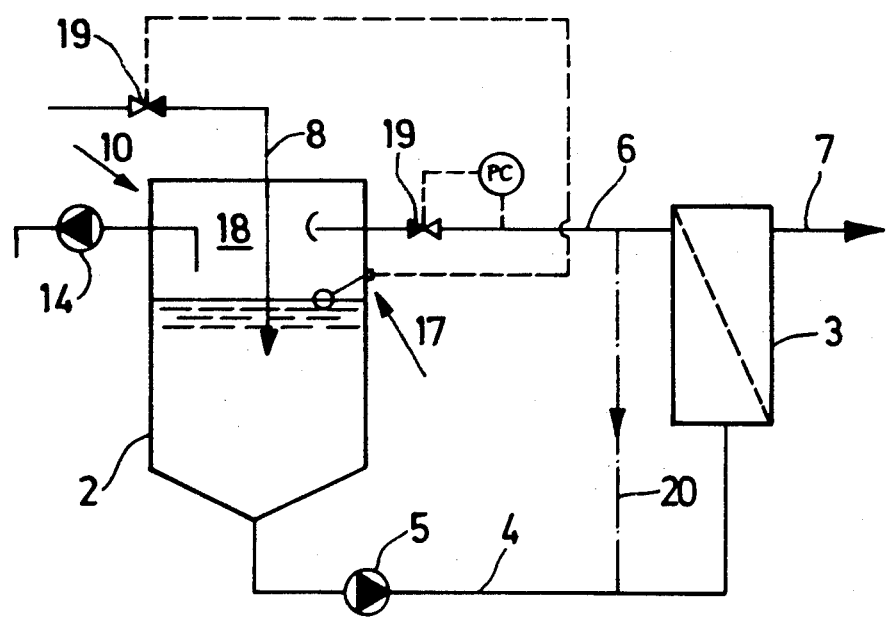
FIG. 2 is a diagrammatic representation of a modification of the apparatus.

In FIG. 2, receptacle 2 is provided with an evacuable chamber 18 above the surface of the liquid contained therein and this evacuable chamber 18 together with the pump 14 defines the vacuum producing device 10. By means of a level control device 17 and a control valve 19, the level of the liquid in receptacle 2 may be closely adjusted so that a closed circulation route for the liquid and an evacuable chamber are maintained. A second control valve 19a in return line 6 provides for permanent excess pressure.

Figure 3:
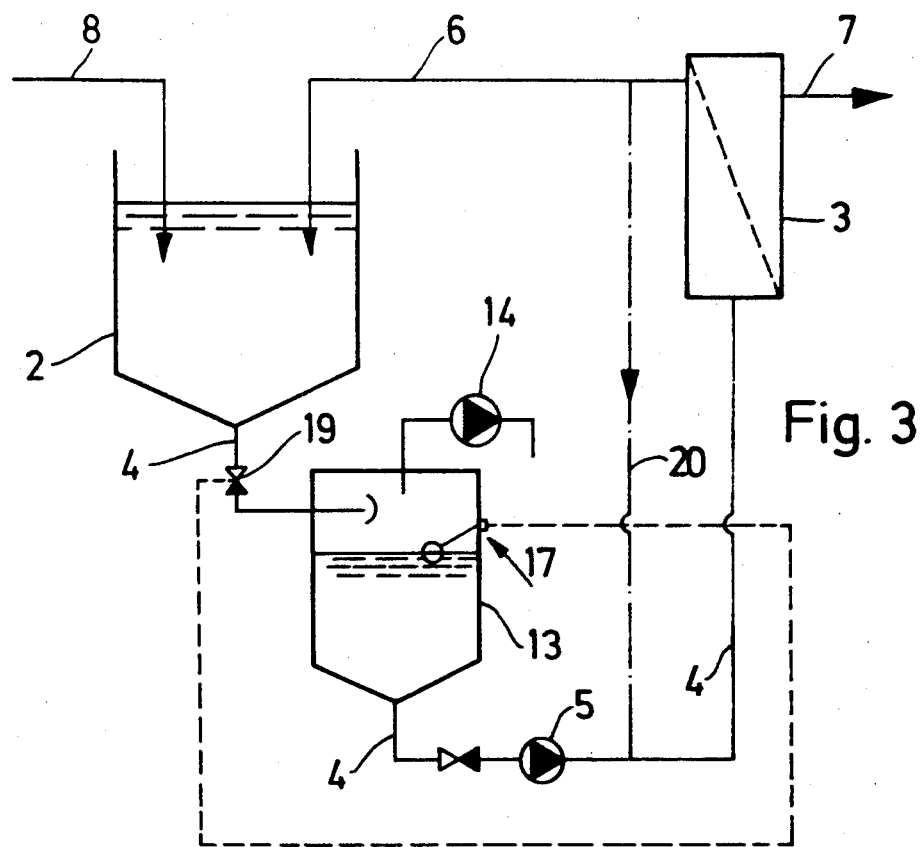
FIG. 3 is a diagrammatic representation of another modification of the apparatus.

A further modification is shown in FIG. 3 wherein the vacuum producing device 10 with its level control device 17 is connected in the delivery line 4 between the receptacle 2 and the filtering device 3. This construction has the advantage that the total amount of liquid to be pumped can very easily be subjected in a simple manner to degassing. Precautions must only be taken that the intermediate container 13 does not become completely empty or remain continuously in a vacuum.

Figure 4:
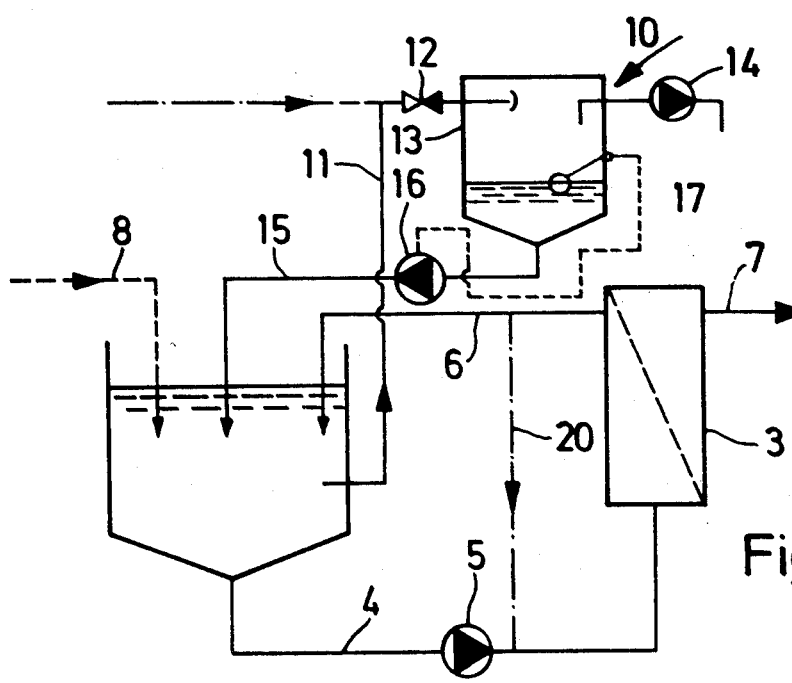
FIG. 4 is a diagrammatic presentation of a further modification of the apparatus.

A further modification for degassing the circulating liquid, comprises attaching the intake line of the vacuum producing device to the receptacle beneath the surface of the liquid contained therein. As a result, the subject invention could then be utilized in a simple way in an existing processing installation. In this modification, a relatively small vacuum device is also suitable for only a partial degassing. Such a modification is shown in FIG. 4 in which degassing is carried out on the liquid from receptacle 2 into which supply line 8, discharge line 15 and return line 6 from filtering device 3 all discharge. In order to maintain a predetermined quantity of liquid in the vacuum container 13, a level controlling device 17 with a control valve 12 located in the intake line 11 is provided. The intake line 11 connects from the receptacle 2 below the level of liquid therein to the vacuum producing device 10. Similar to FIG. 1, raw juice may also be delivered through the vacuum container 13.

With separately attached vacuum producing devices, in which at least small quantities of liquid accumulate, the liquid can be recirculated into the apparatus or the receptacle through a discharge line.

Each of the modifications disclosed herein can be also provided with a by-pass line 20 connected between return line 6 and delivery line 4. As a result, the liquid residues from filtering device 3 could, by admixture, again pass through filtering device 3 before they are discharged into the receptacle 2.

Thus it can be seen that the present invention provides a process and apparatus for degassing liquids as the liquid is circulated through an apparatus for clarifying the liquid. The apparatus is simple in structure and the present invention may be incorporated in existing installations for clarifying of liquids. The apparatus thus provides a simple, reliable and cost-effective structure for degassing liquids which are being clarified or purified.

It will be understood that this invention is susceptible to modification and in order to adapt it to different usages and conditions, and accordingly, it is desired to comprehend such modifications within this invention as may fall within the scope of the appended claims.

What is claimed is:

1. In an apparatus for the clarification of liquids containing entrapped air and other gases, particularly raw juices from fruits, grapes, and berries, in which the liquid residues separated from the liquid by filtration are recycled into the liquid to be clarified, the combination of a recepacle for the liquid to be clarified, a filtration device connected to said receptacle by a delivery line through which liquid flows, a return line from said filtration device connected to said receptacle to circulate liquid residue therein, the connected receptacle, filtration device, delivery and return lines defining a circulation path for the liquid residues, and means for precluding the adverse effects of entrapped air and gases on the taste of the liquid being clarified including degasifaction apparatus connected to said circulation path.

2. In an apparatus as claimed in claim 1, and further comprising a by-pass line connected between said delivery line and said return line such that liquid residue from said filtration device can be recirculated through the filtration device before being discharged into said receptacle.

3. In an apparatus as claimed in claim 1 wherein said degasifiction apparatus comprises a vacuum producing means.

* * * * *